W. V. TURNER.
ELECTROPNEUMATIC BRAKE.
APPLICATION FILED APR. 2, 1917.
1,318,243.
Patented Oct. 7, 1919.
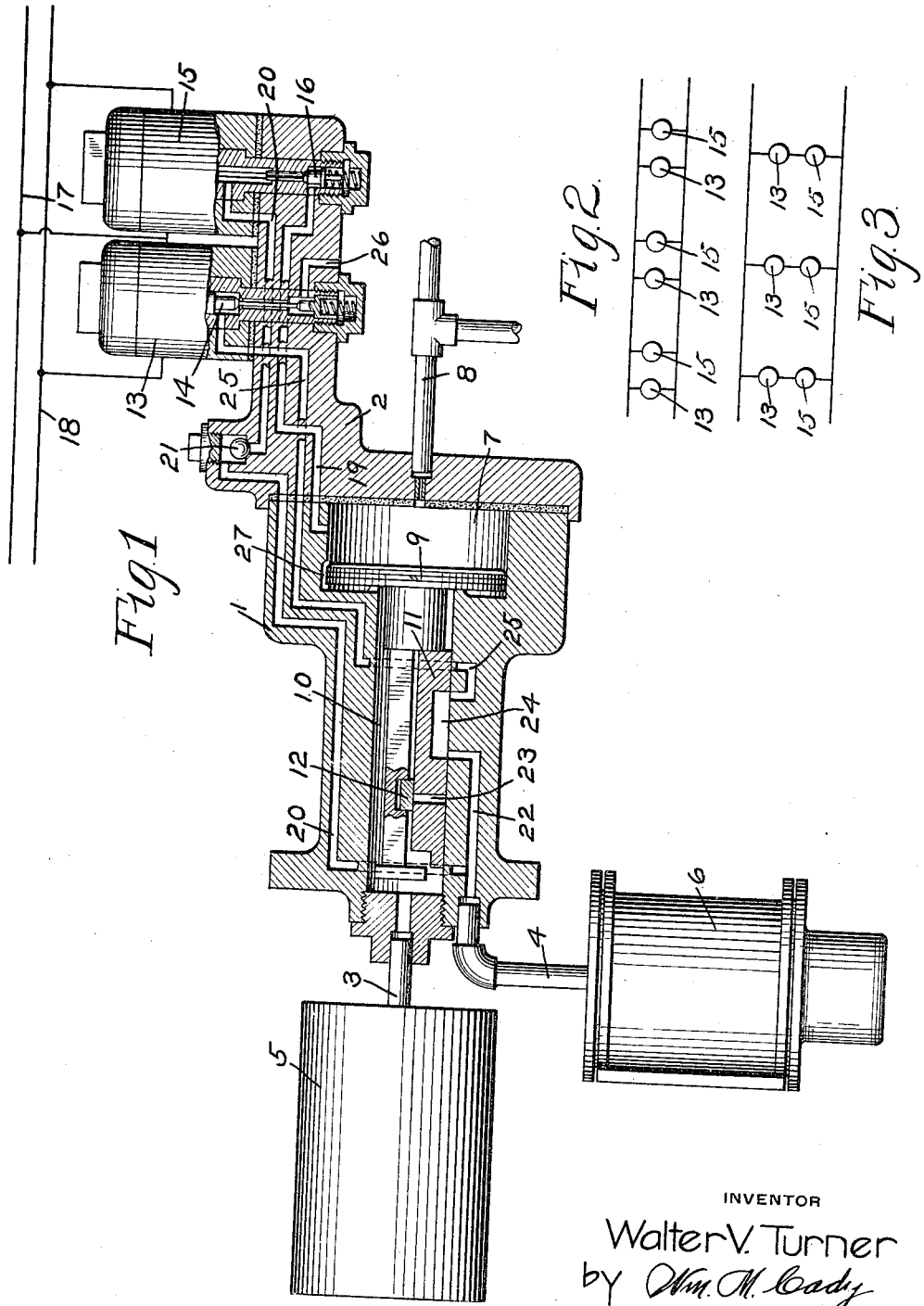
INVENTOR
Walter V. Turner
by Wm. M. Cady
Att'y.

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

ELECTROPNEUMATIC BRAKE.

1,318,243.  Specification of Letters Patent.  Patented Oct. 7, 1919.

Application filed April 2, 1917. Serial No. 159,063.

*To all whom it may concern:*

Be it known that I, WALTER V. TURNER, a citizen of the United States, residing at Wilkinsburg, in the county of Allegheny and State of Pennsylvania, have invented new and useful Improvements in Electropneumatic Brakes, of which the following is a specification.

This invention relates to electro-pneumatic brakes as employed on railway vehicles.

In electro-pneumatic brake equipments, it has heretofore been proposed to employ an application magnet and a release magnet with a separate transmission wire for each magnet.

The principal object of my invention is to provide an electro-pneumatic brake system in which the application and release magnets may be separately controlled through a common transmission line, thus dispensing with one of the train wires heretofore required.

In the accompanying drawing; Figure 1 is a sectional view of an electro-pneumatic brake equipment for a car and embodying my invention; Fig. 2 a wiring diagram, showing one method of connecting up the application and the release magnets; and Fig. 3 a wiring diagram, showing another method of connecting up the application and release magnets.

As shown in Fig. 1 of the drawing, the electro-pneumatic brake equipment may comprise a triple valve device 1, having a magnet bracket 2 secured to the face of the triple valve casing and connected by the respective pipes 3 and 4 to an auxiliary reservoir 5 and a brake cylinder 6.

The triple valve device 1 may comprise the usual casing, having a piston chamber 7 connected to brake pipe 8 and containing piston 9 and having valve chamber 10 connected to auxiliary reservoir 5 and containing a main slide valve 11 and a graduating slide valve 12, mounted on the main slide valve and having a movement relative thereto.

On the magnet bracket 2 there is provided a release magnet 13 for operating a brake cylinder release valve 14 and an application magnet 15 for operating a valve 16 for venting fluid from the piston chamber 7 and the brake pipe 8 to the brake cylinder.

One terminal of each application and release magnet is connected to a common return train wire 17 and the other terminals of the magnets are connected to a common transmission train wire 18.

The application and release magnets are so wound and designed that the maximum voltage required to operate one set of magnets will be less than the minimum voltage required to operate the magnets of the other set, so that one set of magnets can be operated through the common transmission line without operating the other set.

In operation, means being provided for impressing different voltages on the transmission line, if it is desired to effect an electric application of the brakes, a voltage is impressed on the transmission line 18 sufficient to effect the operation of both the application magnet 15 and the release magnet 13. The energization of the application magnet 15 causes the valve 16 to open, so that fluid is vented from piston chamber 7, through passage 19 to passage 20, and thence past the non-return check valve 21 to brake cylinder passage 22 and brake cylinder 6.

The reduction in pressure thus produced causes the movement of the triple valve piston 9, first shifting the graduating valve 12 to uncover port 23 and then moving the main slide valve 11, so that the port 23 registers with passage 22. Fluid is then supplied from the auxiliary reservoir 5 to brake cylinder 6 to effect an application of the brakes.

If the rate of reduction in pressure in piston chamber 7 should exceed the desired service rate, the piston 9 will move out and close or restrict the passage 19, so as to cut off or reduce the venting of fluid from the piston chamber.

The brakes may be fully released by deënergizing the application and release magnets and by increasing the brake pipe pressure to effect the movement of the triple valve piston to release position, in which the fluid in the brake cylinder is released through the passage 22, cavity 24 in the main slide valve 11, and passage 25 to exhaust port 26.

If it is desired to hold the brakes applied and recharge the auxiliary reservoirs 5 throughout the train, a voltage is impressed on the transmission line which is sufficient to energize the release magnets with such force as to operate the release valves 14 to close the brake cylinder exhaust while insufficient to permit the application magnets to hold the valves 16 open. Consequently, the valves 16 will close, permitting fluid to be supplied to the brake pipe to shift the triple valve pistons to release position, in which the usual feed groove 27 is opened around the triple valve piston 9, so that the auxiliary reservoir 5 is recharged, while fluid cannot escape from the brake cylinder, since the release valve 14 is held closed by the release magnet.

The separate operation of the release magnet may also be utilized to secure a simultaneous release of the brakes throughout the train, by first manipulating the brake valve to effect an increase in brake pipe pressure and then after all the triple valve devices have been returned to release position thereby, the release magnets can be separately operated to effect the simultaneous release of fluid from the brake cylinders throughout the train.

The application and the release magnets shown in Fig. 1 of the drawing are connected to the train wires as shown in Fig. 2, but they may be connected up as shown in Fig. 3 of the drawing, if desired.

The voltage on the transmission line gradually decreases from the front to the rear of the train, so that to insure operation when desired each set of magnets must be designed to operate through a range in voltage such that the operation of all the magnets of a given set will be assured, and for this reason, a voltage range is provided for each set of magnets, but the maximum voltage required to operate one set of magnets, such as the release magnets must be less than the minimum voltage at which the application magnets will operate, so that the separate operation of one set of magnets can be secured, in accordance with the principle of my invention.

Having now described my invention, what I claim as new and desire to secure by Letters Patent, is:

1. In an electro-pneumatic brake, the combination with a fluid pressure brake, of magnets for controlling said brake, one magnet being adapted to operate at a voltage less than the minimum voltage at which another magnet will operate.

2. In an electro-pneumatic brake, the combination with a fluid pressure brake, of two magnets for controlling said brake, one of which is adapted to operate at a voltage less than the minimum voltage at which the other magnet will operate.

3. In an electro-pneumatic brake, the combination with a fluid pressure brake, of an application and a release magnet for controlling said brake, the release magnet being adapted to operate at a voltage less than the minimum voltage at which the application magnet will operate.

4. In an electro-pneumatic brake, the combination with a fluid pressure brake, of magnets for controlling said brake and a common wire connected directly to said magnets for supplying electric current thereto.

5. In an electro-pneumatic brake, the combination with a fluid pressure brake, of an electric supply train wire and a return train wire forming an electric circuit and an application and a release magnet for controlling said brake and connected directly to said train wires.

6. In an electro-pneumatic brake, the combination with a fluid pressure brake, of an application and a release magnet for controlling said brake and arranged in the same electric circuit, the release magnet being adapted to operate at a voltage less than the minimum voltage required to operate the application magnet.

7. In an electro-pneumatic brake, the combination with a fluid pressure brake, of an application and a release magnet for controlling said brake and arranged in the same electric circuit, the release magnets and the application magnets being so wound that the least voltage which will be effective to operate the application magnets will be greater than the maximum voltage employed to operate the release magnets.

8. In an electro-pneumatic brake, the combination with a fluid pressure brake, of an application and a release magnet for controlling said brakes, an electric supply wire directly connected to one of the terminals of each magnet, and a return wire directly connected to the other terminals of said magnets.

In testimony whereof I hereunto set my hand.

WALTER V. TURNER.

Copies of this patent may be obtained for five cents each, by addressing the "Commissioner of Patents, Washington, D. C."